(12) United States Patent
Orita

(10) Patent No.: US 9,046,887 B2
(45) Date of Patent: Jun. 2, 2015

(54) ACTUATING APPARATUS

(71) Applicant: HONDA MOTOR CO., LTD., Tokyo (JP)

(72) Inventor: Atsuo Orita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 156 days.

(21) Appl. No.: 14/013,522

(22) Filed: Aug. 29, 2013

(65) Prior Publication Data
US 2014/0062377 A1 Mar. 6, 2014

(30) Foreign Application Priority Data

Aug. 31, 2012 (JP) .................................. 2012-192597

(51) Int. Cl.
G05B 11/32 (2006.01)
B25J 9/16 (2006.01)

(52) U.S. Cl.
CPC ............... G05B 11/32 (2013.01); B25J 9/1633 (2013.01); *G05B 2219/39221* (2013.01); *G05B 2219/39264* (2013.01)

(58) Field of Classification Search
CPC ............... B25J 9/1633; G05B 11/32; G05B 2219/39221; G05B 2219/39264
USPC ............ 318/568.11, 568.13, 568.15, 568.2, 318/625, 648, 651, 671, 689
See application file for complete search history.

(56) References Cited

U.S. PATENT DOCUMENTS

| | | | | |
|---|---|---|---|---|
| 5,355,064 A | * | 10/1994 | Yoshino et al. | 318/568.12 |
| 5,357,424 A | * | 10/1994 | Kakizaki et al. | 700/29 |
| 6,472,839 B1 | * | 10/2002 | Ishii et al. | 318/568.12 |
| 7,260,450 B2 | * | 8/2007 | Okazaki et al. | 700/254 |
| 7,339,340 B2 | * | 3/2008 | Summer et al. | 318/568.12 |
| 8,781,628 B2 | * | 7/2014 | Kwak et al. | 700/258 |

FOREIGN PATENT DOCUMENTS

JP  2005-349555  12/2005

* cited by examiner

*Primary Examiner* — Bentsu Ro
*Assistant Examiner* — Thai Dinh
(74) *Attorney, Agent, or Firm* — Rankin, Hill & Clark LLP

(57) ABSTRACT

An actuating apparatus has an actuator including a link having a plurality of joints and a plurality of motors for actuating the joints, and a controller for controlling the actuator. The controller controls the motors with a control torque $m\_\tau\_cntrl$ calculated according to the equation:

$$m\_\tau\_cntrl = M \cdot (I - m\text{Eff})^{-1} \cdot (dd\theta\_cntrl - m\text{Eff} \cdot dd\theta\_cntrl\_p) + C\_cmpn$$

from a target angular acceleration $dd\theta\_cntrl$, a preceding target angular acceleration $dd\theta\_cntrl\_p$, a displaceable member torque response matrix Eff, an inertial matrix M, and a dynamic corrective force $C\_cmpn$.

6 Claims, 8 Drawing Sheets

ACTUATING APPARATUS

CROSS-REFERENCE TO RELATED APPLICATION

This application is based upon and claims the benefit of priority from Japanese Patent Application No. 2012-192597 filed on Aug. 31, 2012, the contents of which are incorporated herein by reference.

BACKGROUND OF THE INVENTION

1. Field of the Invention

The present invention relates to an actuating apparatus for actuating joints of a robot.

2. Description of the Related Art

Japanese Laid-Open Patent Publication No. 2005-349555 discloses an apparatus for controlling a robot arm having a flexible passive joint with improved controllability against model parameter errors and disturbances.

SUMMARY OF THE INVENTION

The apparatus disclosed in Japanese Laid-Open Patent Publication No. 2005-349555 is capable of controlling a flexible passive joint with improved controllability against disturbances. However, when the joint is actuated at a target angular acceleration, there occurs a response delay such as a first order lag or the like between the target angular acceleration and an actual angular acceleration of the joint, and followability, i.e., the ability to track the target angular acceleration, is deteriorated.

It is an object of the present invention to provide an actuating apparatus which improves followability of actual angular acceleration with respect to a target angular acceleration of a joint.

According to the present invention, there is provided an actuating apparatus comprising an actuator including a link having a plurality of displaceable members and a plurality of rotary prime movers for actuating the displaceable members, and a controller for controlling the actuator, wherein the controller includes a control torque calculator for calculating a control torque for the displaceable members so that an actual angular acceleration of the displaceable members will reach a present target angular acceleration of the displaceable members after a sampling time, using a displaceable member torque response matrix representing a torque response of the displaceable members, an inertial matrix of the actuator determined by an angle of the displaceable members, the present target angular acceleration of the displaceable members, and a preceding target angular acceleration of the displaceable members.

In the above actuating apparatus, each of the displaceable members comprises a joint which is rotatable or a back-and-forth member which is actuatable back and forth.

In the above actuating apparatus, the controller calculates the control torque according to the following equation (1):

$$m\_\tau\_cntrl = M \cdot (I - mEff)^{-1} \cdot (dd\theta\_cntrl - mEff \cdot dd\theta\_cntrl\_p) + C\_cmpn \quad (1)$$

where $$mEff = M^{-1} \cdot Eff \cdot M$$

$$Eff = \begin{pmatrix} eff_1 & & 0 \\ & \ddots & \\ 0 & & eff_n \end{pmatrix} = \begin{pmatrix} \frac{Tc_1}{DT} \cdot \left(1 - \exp\left(-\frac{DT}{Tc_1}\right)\right) & & 0 \\ & \ddots & \\ 0 & & \frac{Tc_n}{DT} \cdot \left(1 - \exp\left(-\frac{DT}{Tc_n}\right)\right) \end{pmatrix},$$

$$m\_\tau\_cntrl = \begin{pmatrix} m\_\tau_1\_cntrl \\ m\_\tau_2\_cntrl \\ \vdots \\ m\_\tau_n\_cntrl \end{pmatrix}, dd\theta\_cntrl = \begin{pmatrix} dd\theta_1\_cntrl \\ dd\theta_2\_cntrl \\ \vdots \\ dd\theta_n\_cntrl \end{pmatrix},$$

$$C\_cmpn = \begin{pmatrix} C_1\_cmpn \\ C_2\_cmpn \\ \vdots \\ C_n\_cmpn \end{pmatrix}$$

where
$m\_\tau_i\_cntrl$: control torques for i respective displaceable members;
M: an inertial matrix of the actuator;
I: a unit matrix;
Eff: a displaceable member torque response matrix;
$eff_i$: displaceable member torque response coefficients;
$Tc_i$: time constants for respective displaceable members;
DT: a sampling time;
$dd\theta_i\_cntrl$: target angular accelerations for respective displaceable members;
$dd\theta\_cntrl\_p$: a vector representation of preceding target angular accelerations $dd\theta_i\_cntrl\_p$ for i respective displaceable members; and
$C_i\_cmpn$: force vectors of centrifugal forces, Coriolis forces, or the like, generated by the motion of i respective displaceable members, wherein
i=0, 1, 2, . . . , n In the above actuating apparatus, a minimum time constant of the displaceable members is measured, and displaceable member torque response coefficients which are diagonal elements of the displaceable member torque response matrix are set using the measured minimum time constant.

In the above actuating apparatus, the control torque calculator calculates the present target angular acceleration of the displaceable members and the preceding target angular acceleration of the displaceable members, using a present target acceleration of change and a preceding target acceleration of change at a predetermined task position on the link and a coefficient matrix representing the relationship between a rate of change at the task position and angular velocities of the displaceable members, for thereby calculating the control torque for the displaceable members so that an actual acceleration of change at the task position will reach the present target acceleration of change after the sampling time.

In the above actuating apparatus, the actuator includes a base supported on the link, and the control torque calculator calculates the control torque for the displaceable members so that an actual actuator displacement acceleration which includes an actual angular acceleration of the displaceable members and actual displacement accelerations in respective directions of the base will reach a present target actuator displacement acceleration after the sampling time, from the present target actuator displacement acceleration which includes the present target angular acceleration and target displacement accelerations in respective directions of the base, and a preceding target actuator displacement acceleration, using a force response matrix representing the response of a force which a task position on a distal end of the link receives from the ground, a coefficient matrix representing the relationship between rates of change in respective directions of the base and a rate of change at the task position on the link, and a coefficient matrix representing the relationship between the rate of change at the task position and an angular velocity of the displaceable members.

According to the present invention, since the control torque calculator calculates a control torque for the displaceable members so that an actual angular acceleration of the displaceable members will reach a present target angular acceleration of the displaceable members after a sampling time, using a displaceable member torque response matrix representing a torque response of the displaceable members, an inertial matrix of the actuator determined by an angle of the displaceable members, the present target angular acceleration of the displaceable members, and a preceding target angular acceleration of the displaceable members, the actuation of a plurality of joints can be controlled with an improved responsiveness, making it possible to enhance followability of the actual angular accelerations of the joints with respect to the target angular accelerations of the joints.

According to the present invention, furthermore, since the control torque calculator calculates the present target angular acceleration of the displaceable members and the preceding target angular acceleration of the displaceable members, using a present target acceleration of change and a preceding target acceleration of change at a predetermined task position on the link and a coefficient matrix representing the relationship between a rate of change at the task position and angular velocities of the displaceable members, for thereby calculating the control torque for the displaceable members so that an actual acceleration of change at the task position will reach the present target acceleration of change after the sampling time, the actuation of the task position can be controlled with an improved responsiveness, making it possible to enhance followability of the actual acceleration of change at the task position with respect to the target acceleration of change at the task position.

According to the present invention, moreover, since the actuator includes a base supported on the link, and the control torque calculator calculates the control torque for the displaceable members so that an actual actuator displacement acceleration which includes an actual angular acceleration of the displaceable members and actual displacement accelerations in respective directions of the base will reach a present target actuator displacement acceleration after the sampling time, from the present target actuator displacement acceleration which includes the present target angular acceleration and target displacement accelerations in respective directions for the base, and a preceding target actuator displacement acceleration, using a force response matrix representing the response of a force which a task position on a distal end of the link receives from the ground, a coefficient matrix representing the relationship between rates of change in respective directions of the base and a rate of change at the task position on the link, and a coefficient matrix representing the relationship between the rate of change at the task position and an angular velocity of the displaceable members, the actuation of the base can be controlled with an improved responsiveness, making it possible to enhance followability of the actual displacement acceleration of the base with respect to the target displacement acceleration of the base.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Actuating apparatus according to preferred embodiments of the present invention will be described in detail below with reference to the accompanying drawings.

Figure 1:
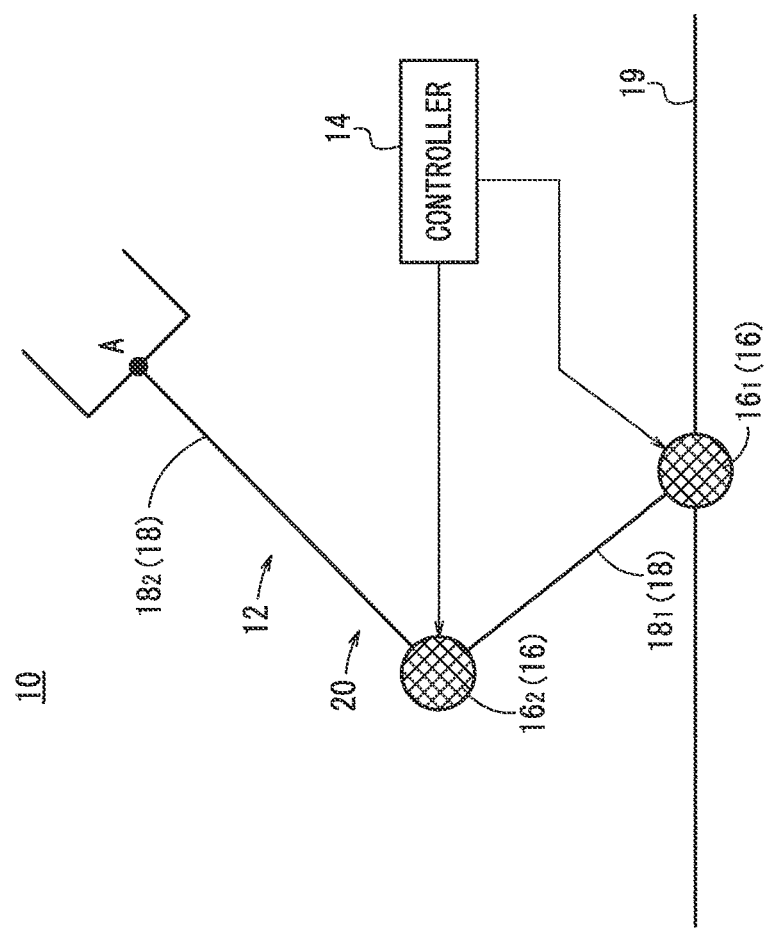
FIG. 1 is a diagram showing an actuating apparatus according to an embodiment of the present invention.

FIG. 1 shows an actuating apparatus 10 according to an embodiment of the present invention. As shown in FIG. 1, the actuating apparatus 10 includes an actuator 12 and a controller 14. The actuator 12 includes a link 20 having a plurality of joints 16 ($16_1$, $16_2$) and a plurality of connectors 18 ($18_1$, $18_2$). The connectors 18 are interconnected by the joints 16 which serve as displaceable members. The joint $16_1$ of a foundation of the link 20 is mounted on a base 19.

In FIG. 1, the actuator 12 is shown as having two joints 16 ($16_1$, $16_2$) and two connectors 18 ($18_1$, $18_2$). However, the actuator 12 according to the present embodiment will be described below as having n joints 16 and n connectors 18. The respective joints 16 will be represented by $16_i$, and the respective connectors 18 will be represented by $18_i$ where i represents i=1, 2, . . . , n, indicating the number of a joint 16 or a connector 18.

Figure 2:
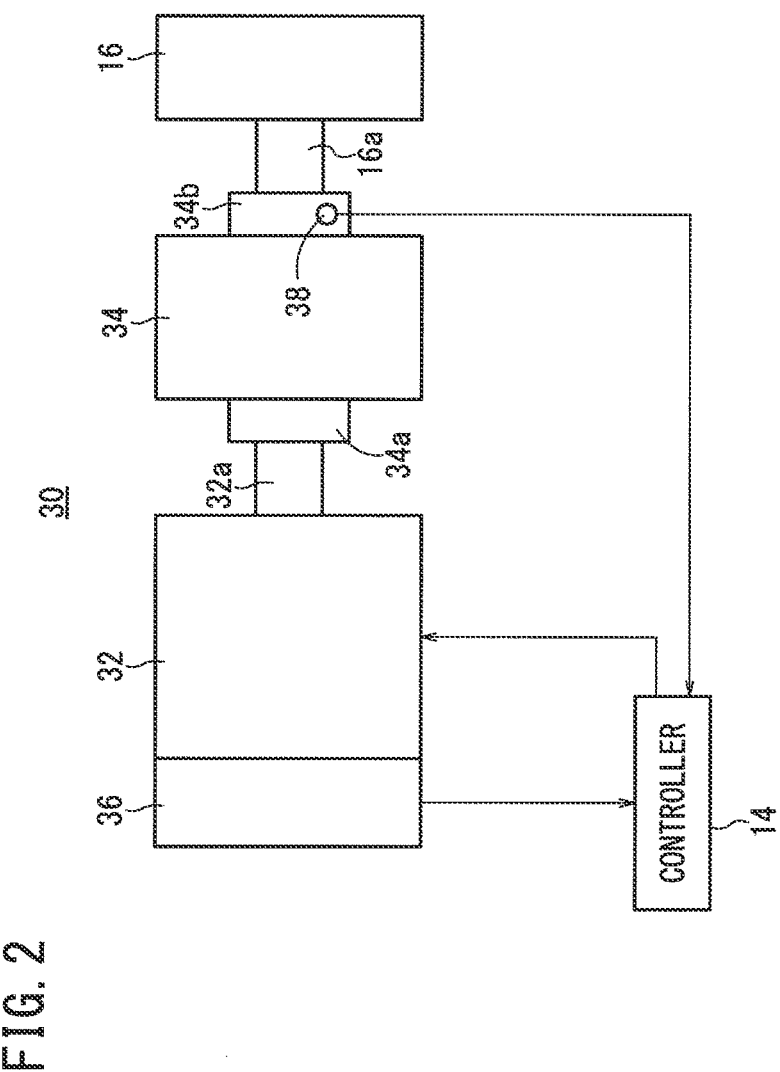
FIG. 2 is a schematic view of the structure of a displaceable member actuating system of an actuator.

FIG. 2 shows the structure of a displaceable member actuating system 30 of the actuator 12. As shown in FIG. 2, the displaceable member actuating system 30 has a motor 32 and a speed reducer 34. A joint 16 is operatively connected to the motor 32 through the speed reducer 34.

The motor 32, which serves as a rotary prime mover, is an electric motor that is supplied with electric energy from an electric power supply, not shown, to generate a torque tending to rotate an output shaft 32a connected to the motor 32 about its own axis. The output shaft 32a is connected to an input shaft 34a of the speed reducer 34 for rotating the input shaft 34a in unison with the output shaft 32a. The speed reducer 34 outputs rotational power input to the input shaft 34a at a given speed reduction ratio from an output shaft 34b thereof. The output shaft 34b of the speed reducer 34 is connected to an input shaft 16a of the joint 16.

The displaceable member actuating system 30 has an angle sensor 36 for detecting an angle of the motor 32 and a torque sensor 38 for detecting a torque applied to the joint 16. For an easier understanding of the present invention, the speed reducer 34 will be omitted from description and the angle and torque of the motor 32 will be described as the angle and torque of the joint 16. The angles of the respective joints $16_i$, i.e., the angles of the motors 32 which actuate the respective joints $16_i$, will be represented by $\theta_i$. The angles $\theta_i$ of the joints $16_i$ refer to angles from a certain reference angle. From equations of motion, the following equations are satisfied.

$$M \cdot dd\theta\_cntrl + C\_cmpn = \tau\_cntrl \tag{2}$$

where $$M = \begin{pmatrix} m_{11} & \cdots & m_{1n} \\ \vdots & \ddots & \vdots \\ m_{n1} & \cdots & m_{nn} \end{pmatrix}, dd\theta\_cntrl = \begin{pmatrix} dd\theta_1\_cntrl \\ dd\theta_2\_cntrl \\ \vdots \\ dd\theta_n\_cntrl \end{pmatrix}$$

$$C\_cmpn = \begin{pmatrix} C_1\_cmpn \\ C_2\_cmpn \\ \vdots \\ C_n\_cmpn \end{pmatrix}, \tau\_cntrl = \begin{pmatrix} \tau_1\_cntrl \\ \tau_2\_cntrl \\ \vdots \\ \tau_n\_cntrl \end{pmatrix}$$

$$M \cdot dd\theta\_act + C\_cmpn = \tau\_act \tag{3}$$

where $$dd\theta\_act = \begin{pmatrix} dd\theta_1\_act \\ dd\theta_2\_act \\ \vdots \\ dd\theta_n\_act \end{pmatrix}, \tau\_act = \begin{pmatrix} \tau_1\_act \\ \tau_2\_act \\ \vdots \\ \tau_n\_act \end{pmatrix}$$

In the above equations, a target torque $\tau\_cntrl$ is a vector representation of target torques $\tau_i\_cntrl$ for the motors 32 which actuate the respective joints $16_i$ (target torques $\tau_i\_cntrl$ for the joints $16_i$). A target angular acceleration $dd\theta\_cntrl$ is a vector representation of target angular accelerations $dd\theta_i\_cntrl$ for the motors 32 which actuate the respective joints $16_i$ (target angular accelerations $dd\theta_i\_cntrl$ for the respective joints $16_i$). The target angular accelerations $dd\theta_i\_cntrl$ for the respective joints $16_i$ are target angular accelerations for the respective joints $16_i$ at the time the target torques $\tau_i\_cntrl$ are applied to the respective joints $16_i$.

An actual torque $\tau\_act$ is a vector representation of actual torques $\tau_i\_act$ of the motors 32 which actuate the respective joints $16_i$ (actual torques $\tau_i\_act$ of the respective joints $16_i$). An actual angular acceleration $dd\theta\_act$ is a vector representation of actual angular accelerations $dd\theta_i\_act$ of the motors 32 which actuate the respective joints $16_i$ (actual angular accelerations $dd\theta_i\_act$ of the respective joints $16_i$). The actual angular accelerations $dd\theta_i\_act$ of the respective joints $16_i$ are actual angular accelerations of the respective joints $16_i$ at the time the actual torques $\tau_i\_act$ are applied to the respective joints $16_i$.

A dynamic corrective force $C\_cmpn$ is a vector representation of dynamic corrective forces $C_i\_cmpn$ which represent force vectors generated by the angles $\theta_i$ and angular accelerations $d\theta_i$ of the motors 32 of the respective joints $16_i$ under a centrifugal force, a Coriolis force, etc. An inertial matrix M is a matrix representing the inertial moment (inertia) of the actuator 12. The dynamic corrective force $C\_cmpn$ and the inertial matrix M are determined depending on the angles of the respective joints $16_i$ (the angles of the motors 32 of the respective joints $16_i$).

Figure 3:
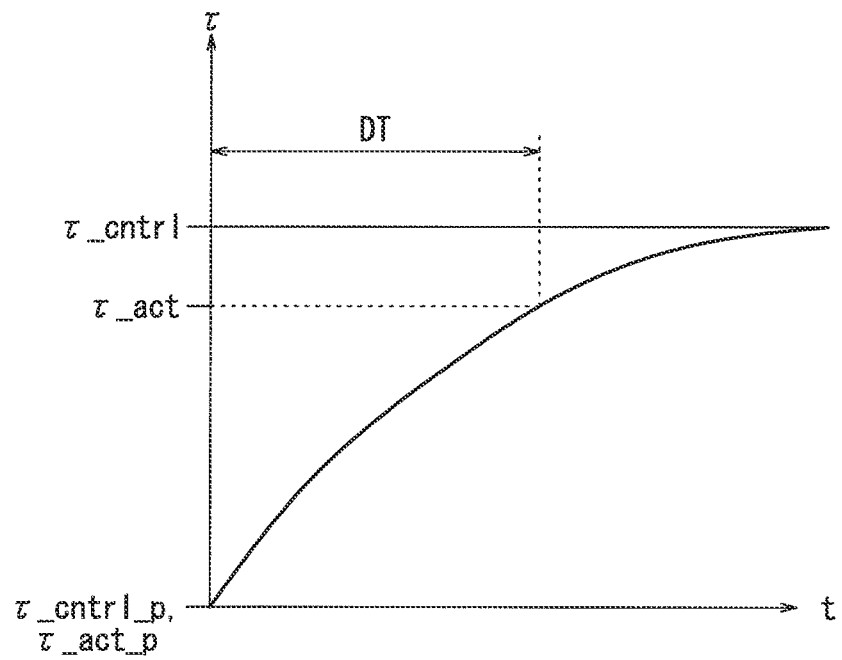
FIG. 3 is a graph showing a first order lag of an actual torque from a target torque.

Ideally, since a target torque $\tau\_cntrl$ is equal to an actual torque $\tau\_act$, an actual angular acceleration $dd\theta\_act$ is equal to target angular acceleration $dd\theta\_cntrl$. In reality, however, an actual torque $\tau\_act$ is a first order lag system of a target torque $\tau\_cntrl$, and the above ideal relationship does not hold true upon elapse of a sampling time DT, as shown in FIG. 3. An actual torque $\tau\_act$ is expressed by the following equation:

$$\tau\_act = (\tau\_cntrl \cdot \tau\_cntrl\_p) \cdot L + \tau\_act\_p \tag{4}$$

where $$L = \begin{pmatrix} 1 - \exp\left(-\frac{t}{Tc_1}\right) & & 0 \\ & \ddots & \\ 0 & & 1 - \exp\left(-\frac{t}{Tc_n}\right) \end{pmatrix}$$

In the above equation, $\tau\_cntrl\_p$ refers to a vector representation of preceding target torques $\tau_i\_cntrl\_p$ for the motors 32 of the respective joints $16_i$, $\tau\_act\_p$ refers to a vector representation of preceding actual torques $\tau_i\_act\_p$ of the motors 32 of the respective joints $16_i$, t represents time, $Tc_i$ represents time constants of the motors 32 of the respective joints $16_i$, and L represents a diagonal matrix. In FIG. 3, it is assumed that the actuating apparatus starts from a still state, and the preceding target torque $\tau\_cntrl\_p$ is of the same value as the preceding actual torque $\tau\_act\_p$. In the present embodiment, any value denoted with "_p" represents a preceding value.

The equation (4) may be integrated with respect to the sampling time DT and divided by the sampling time DT to derive the equation (5) shown below. A diagonal matrix Eff is a displaceable member torque response matrix representing the torque responses of the motors 32 of plural joints 16, and diagonal elements thereof are represented by $eff_i$ that indicates displaceable member torque response coefficients of the motors 32 of the respective joints $16_i$.

Specifically, $eff_1$ indicates the displaceable member torque response coefficient of the motor 32 of the joint $16_1$, and $eff_2$ indicates the displaceable member torque response coefficient of the motor 32 of the joint $16_2$. Since it is assumed that the actuating apparatus starts from a still state, the equation (5) is derived from the equation (4) using the equation: $\tau\_act\_p = \tau\_cntrl\_p$.

$$\tau\_act = \tau\_cntrl - Eff \cdot (\tau\_cntrl \cdot \tau\_cntrl\_p) \tag{5}$$

where $$Eff = \begin{pmatrix} eff_1 & & 0 \\ & \ddots & \\ 0 & & eff_n \end{pmatrix} =$$

$$\begin{pmatrix} \frac{Tc_1}{DT} \cdot \left(1 - \exp\left(-\frac{DT}{Tc_1}\right)\right) & & 0 \\ & \ddots & \\ 0 & & \frac{Tc_n}{DT} \cdot \left(1 - \exp\left(-\frac{DT}{Tc_n}\right)\right) \end{pmatrix}$$

The following equation (6) can be derived from the equation (5).

$$\tau\_act = (I - Eff) \cdot \tau\_cntrl + Eff \cdot \tau\_cntrl\_p \tag{6}$$

The following equation (7) can be derived from the equations (2) and (6).

$$\tau\_act = (I - \text{Eff}) \cdot (M \cdot dd\theta\_cntrl + C\_cmpn) + \text{Eff} \cdot (M \cdot dd\theta\_cntrl\_p + C\_cmpn\_p) \quad (7)$$

where $dd\theta\_cntrl\_p$ is a vector representation of preceding target angular accelerations $dd\theta_i\_cntrl\_p$ for the motors 32 of the respective joints 16$_i$, and $C\_cmpn\_p$ is a vector representation of preceding dynamic corrective forces $C_i\_cmpn\_p$.

Since the dynamic corrective force $C\_cmpn$ does not change greatly from the preceding dynamic corrective force $C\_cmpn\_p$ in one sampling time DT, the dynamic corrective force $C\_cmpn$ can be regarded as being equal to the preceding dynamic corrective force $C\_cmpn\_p$. Therefore, the following equation (8) can be derived from the equations (3), (7), and the equation $C\_cmpn = C\_cmpn\_p$.

$$dd\theta\_act = M^{-1} \cdot (I - \text{Eff}) \cdot M \cdot dd\theta\_cntrl + M^{-1} \cdot \text{Eff} \cdot M \cdot dd\theta\_cntrl\_p = (I - m\text{Eff}) \cdot dd\theta\_cntrl + m\text{Eff} \cdot dd\theta\_cntrl\_p \quad (8)$$

where $$m\text{Eff} = M^{-1} \cdot \text{Eff} \cdot M$$

In order for the actual angular acceleration $dd\theta\_act$ to reach the value of the target angular acceleration $dd\theta\_cntrl$ after a sampling time, it needs to satisfy the following equation (9).

$$dd\theta\_cntrl = \quad (9)$$
$$(I - m\text{Eff}) \cdot m\_dd\theta\_cntrl + m\text{Eff} \cdot dd\theta\_cntrl\_p \Rightarrow m\_dd\theta\_cntrl =$$
$$(I - m\text{Eff})^{-1} \cdot dd\theta\_cntrl - (I - m\text{Eff})^{-1} \cdot m\text{Eff} \cdot dd\theta\_cntrl\_p$$

$$m\_dd\theta\_cntrl = \begin{pmatrix} m\_dd\theta_1\_cntrl \\ m\_dd\theta_2\_cntrl \\ \vdots \\ m\_dd\theta_n\_cntrl \end{pmatrix}$$

In the above equation (9), a control angular acceleration $m\_dd\theta\_cntrl$ is a vector representation of control angular accelerations $m\_dd\theta_i\_cntrl$ for the motors 32 of the respective joints 16$_i$, and control angular accelerations $m\_dd\theta_i\_cntrl$ are control angular accelerations for making the actual angular accelerations $dd\theta_i\_act$ of the motors 32 of the respective joints 16$_i$ reach the values of the target angular accelerations $dd\theta_i\_cntrl$ after a sampling time.

Using the control angular acceleration $m\_dd\theta\_cntrl$, the equation (2) can be expressed as follows:

$$M \cdot m\_dd\theta\_cntrl + C\_cmpn = m\_\tau\_cntrl \quad (10)$$

where $$m\_\tau\_cntrl = \begin{pmatrix} m\_\tau_1\_cntrl \\ m\_\tau_2\_cntrl \\ \vdots \\ m\_\tau_n\_cntrl \end{pmatrix}$$

In the above equation (10), a control torque $m\_\tau\_cntrl$ is a vector representation of control torques $m\_\tau_i\_cntrl$ for the motors 32 of the respective joints 16$_i$, and is a control torque for providing control angular accelerations $m\_dd\theta_i\_cntrl$ for the motors 32 of the respective joints 16$_i$ at the time the control torques $m\_\tau_i\_cntrl$ are applied to the motors 32 of the respective joints 16$_i$.

From the equations (9), (10), the following equation (11) can be derived.

$$m\_\tau\_cntrl = M \cdot (I - m\text{Eff})^{-1} \cdot (dd\theta\_cntrl - m\text{Eff} \cdot dd\theta\_cntrl\_p) + C\_cmpn \quad (11)$$

It is thus possible to determine control torques $m\_\tau_i\_cntrl$ for the motors 32 of the respective joints 16$_i$ so that actual angular accelerations $dd\theta_i\_act$ of the motors 32 of the respective joints 16$_i$ reach present target angular accelerations $dd\theta_i\_cntrl$ after a sampling time DT, using the present target angular accelerations $dd\theta_i\_cntrl$ for the motors 32 of the respective joints 16$_i$, preceding target angular accelerations $dd\theta_i\_cntrl\_p$ for the motors 32 of the respective joints 16$_i$, an inertial matrix M, and a displaceable member torque response matrix Eff, etc.

The target angular acceleration $dd\theta\_cntrl$ is determined by a PD control process according to the equation $dd\theta\_cntrl = Kp \cdot (\theta\_des - \theta\_act) + Kv \cdot (d\theta\_des - d\theta\_act)$. Control torques $m\_\tau_i\_cntrl$ are determined from the target angular acceleration $dd\theta\_cntrl$ thus determined, and the motors 32 of the joints 16$_i$ are controlled according to the control torques $m\_\tau_i\_cntrl$ thus determined. Therefore, the motors 32 of the respective joints 16$_i$ are controlled with an improved responsiveness.

In the above equation, Kp represents a proportionality gain, Kv represents a derivative gain, $\theta\_des$ represents a vector representation of demand angles $\theta_i\_des$ for the motors 32 of the respective joints 16$_i$, $\theta\_act$ is a vector representation of actual angles $\theta_i\_act$ of the motors 32 of the respective joints 16$_i$, $d\theta\_des$ is a vector representation of demand angular velocities $d\theta_i\_des$ for the motors 32 of the respective joints 16$_i$, and $d\theta\_act$ is a vector representation of actual angular velocities $d\theta_i\_act$ of the motors 32 of the respective joints 16$_i$. The actual angles $\theta_i\_act$ are of values detected by the angle sensors 36 of the motors 32 of the respective joints 16$_i$, and the actual angular velocities $d\theta_i\_act$ are determined from the actual angles $\theta_i\_act$.

The responsiveness of a predetermined task position A (see FIG. 1) on the link 20 can be improved to control the actuation of the task position A. Since the link 20 is supported by the joints 16 at a certain posture, the task position A changes when the angular velocities $d\theta_i$ of the motors 32 of the respective joints 16$_i$ change. This can be expressed by the following equation (12), using a Jacobian matrix J.

$$ddx\_cntrl = J \cdot dd\theta\_cntrl \quad (12)$$

where $$ddx\_cntrl = \begin{pmatrix} ddx_1\_cntrl \\ ddx_2\_cntrl \\ \vdots \\ ddx_n\_cntrl \end{pmatrix}, \quad dd\theta\_cntrl = \begin{pmatrix} dd\theta_1\_cntrl \\ dd\theta_2\_cntrl \\ \vdots \\ dd\theta_n\_cntrl \end{pmatrix}$$

where a target angular velocity $d\theta\_cntrl$ is a vector representation of target angular velocities $d\theta_i\_cntrl$ for the motors 32 of the respective joints 16$_i$, and a target rate of change $dx\_cntrl$ is a vector representation of target rates of change $dx_1\_cntrl, dx_2\_cntrl, dx_n\_cntrl$ in respective directions at the task position A. The directions include an x-axis direction, a y-axis direction, a rotational direction about an x-axis, and a rotational direction about a y-axis.

When the equation (12) is differentiated, it is expressed by the equation (13) below. In the equation (13), a target acceleration of change $ddx\_cntrl$ is a vector representation of target accelerations of change $ddx_1\_cntrl$, $ddx_2\_cntrl$, $ddx_n\_cntrl$ in respective directions at the task position A.

$$ddx\_cntrl = ddJ \cdot dd\theta\_cntrl + J \cdot dd\theta\_cntrl \quad (13)$$

where $$ddx\_cntrl = \begin{pmatrix} ddx_1\_cntrl \\ ddx_2\_cntrl \\ \vdots \\ ddx_n\_cntrl \end{pmatrix}$$

Consequently, $J \cdot dd\theta\_cntrl - J \cdot mEff \cdot dd\theta\_cntrl\_p$ can be expressed by the equation (14) below, using the equation (13). $d\theta\_cntrl\_p$ is a vector representation of preceding target angular velocities $d\theta_i\_cntrl\_p$ for the motors 32 of the respective joints 16$_i$, and $ddx\_cntrl\_p$ is a vector representation of preceding target accelerations of change $ddx_i\_cntrl\_p$ in respective directions at the task position A.

$$J \cdot dd\theta\_cntrl - J \cdot mEff \cdot dd\theta\_cntrl\_p = ddx\_cntrl - ddJ \cdot dd\theta\_cntrl - \quad (14)$$
$$J \cdot mEff \cdot (J^{-1} \cdot ddx\_cntrl\_p - J^{-1} \cdot ddJ \cdot dd\theta\_cntrl\_p) =$$
$$ddx\_cntrl - jmEff \cdot ddx\_cntrl\_p -$$
$$(ddJ \cdot dd\theta\_cntrl - jmEff \cdot ddJ \cdot dd\theta\_cntrl\_p)$$

where $$jmEff = J \cdot mEff \cdot J^{-1}$$

The equation (14) can be modified into the following equation (15).

$$J \cdot \text{filt}d\_dd\theta\_cntrl = \text{filt}d\_ddx\_cntrl - (dJ \cdot d\theta\_cntrl - jmEff \cdot dJ \cdot d\theta\_cntrl\_p) \quad (15)$$

where $$\text{filt}d\_dd\theta\_cntrl = dd\theta\_cntrl - mEff \cdot dd\theta\_cntrl\_p$$

$$\text{filt}d\_ddx\_cntrl = ddx\_cntrl - jmEff \cdot ddx\_cntrl\_p$$

The equation (11) can be modified into the following equation (16):

$$M' \cdot (dd\theta\_cntrl - mEff \cdot dd\theta\_cntrl\_p) + C\_cmpn = m\_\tau\_cntrl \quad (16)$$

where $$M' = M \cdot (I - mEff)^{-1}$$

The following equation (17) is derived by multiplying the terms of the equation (16) by $J \cdot (M')^{-1}$.

$$J \cdot (dd\theta\_cntrl - mEff \cdot dd\theta\_cntrl\_p) + J \cdot (M')^{-1} \cdot C\_cmpn = J \cdot (M')^{-1} \cdot m\_\tau\_cntrl \quad (17)$$

The equation (17) can be rewritten as follows, using the equations in the proviso of the equation (15).

$$J \cdot \text{filt}d\_dd\theta\_cntrl + J \cdot (M')^{-1} \cdot C\_cmpn = J \cdot (M')^{-1} \cdot m\_\tau\_cntrl \quad (18)$$

The control torque $m\_\tau\_cntrl$ and the force F at the task position A can be expressed as follows, using the transposed matrix $J^T$ of the Jacobian matrix J. The force F is a vector representation of forces $f_1, f_2, \ldots, f_n$ in respective directions at the task position A.

$$m\_\tau\_cntrl = J^T \cdot F \quad (19)$$

where $$F = \begin{pmatrix} f_1 \\ f_2 \\ \vdots \\ f_n \end{pmatrix}$$

Using the equations (15), (19), the equation (18) can be modified in the following equation (20).

$$\text{filt}d\_ddx\_cntrl - (dJ \cdot d\theta\_cntrl - jmEff \cdot dJ \cdot d\theta\_cntrl\_p) + J \cdot (M')^{-1} \cdot C\_cmpn = J \cdot (M')^{-1} \cdot J^T \cdot F \quad (20)$$

The equation (20) can be modified into the following equation (21).

$$\Lambda' \cdot \text{filt}d\_ddx\_cntrl - \Lambda' \cdot (dJ \cdot d\theta\_cntrl - jmEff \cdot dJ \cdot d\theta\_cntrl\_p) + \Lambda' \cdot J \cdot (M')^{-1} \cdot C\_cmpn = F \quad (21)$$

where $$\Lambda' = (J \cdot (M')^{-1} \cdot J^T)^{-1}$$

The equation (21) can be modified into the following equation (22).

$$\Lambda' \cdot \text{filt}d\_ddx\_cntrl + \mu = F \quad (22)$$

Where $$\mu = -\Lambda' \cdot (ddJ \cdot dd\theta\_cntrl - jmEff \cdot ddJ \cdot dd\theta\_cntrl\_p) + \Lambda' \cdot J \cdot (M')^{-1} \cdot C\_cmpn$$

Since the equation (11) can be modified into the equation (22), the responsiveness of the task position A can be improved by controlling the actuation of the motors 32 of the respective joints 16$_i$. Specifically, using the present target acceleration of change ddx_cntrl and the preceding target acceleration of change ddx_cntrl_p at the task position A, the force F at the task position A can be determined so that the actual acceleration of change ddx_act at the task position A reaches the target acceleration of change ddx_cntrl at the task position A. Based on the determined force F, the control torques m_τ_cntrl for the respective joints 16$_i$ are determined according to the equation (19), and the motors 32 of the respective joints 16$_i$ are controlled based on the determined control torques m_τ_cntrl, thereby improving the responsiveness of the task position A.

Using the equation (12), the equation (13) can be modified as follows:

$$dd\theta\_cntrl = J^{-1} \cdot ddx\_cntrl - J^{-1} \cdot dJ \cdot d\theta\_cntrl$$

$$\Rightarrow$$

$$dd\theta\_cntrl = J^{-1} \cdot ddx\_cntrl - J^{-1} \cdot dJ \cdot J^{-1} \cdot dx\_cntrl \quad (23)$$

The following equation (24) can be derived from the equation (23).

$$dd\theta\_cntrl\_p = J^{-1} \cdot ddx\_cntrl\_p - J^{-1} \cdot dJ \cdot J^{-1} \cdot dx\_cntrl\_p \quad (24)$$

By substituting the equations (23), (24) in $dd\theta\_cntrl$ and $dd\theta\_cntrl\_p$ in the equation (11), it is possible to determine control torques m_τ$_i$_cntrl for the motors 32 of the respective joints 16$_i$ for improving the responsiveness of the task position A. Specifically, it is possible to determine the control torques m_τ$_i$_cntrl for the motors 32 of the respective joints $16_i$, using the present target acceleration of change ddx_cntrl, the preceding target acceleration of change ddx_cntrl_p, the present target rate of change dx_cntrl, and the preceding target rate of change dx_cntrl_p.

The time constant $Tc_i$ which represents the torque response of the motors 32 of the respective joints $16_i$ is different dependent on the inertial moments of the support and load sides, such as the state of the link 20, e.g., the actual angles $\theta_{i\_act}$ of the motors 32 of the joints $16_i$.

Figure 4:
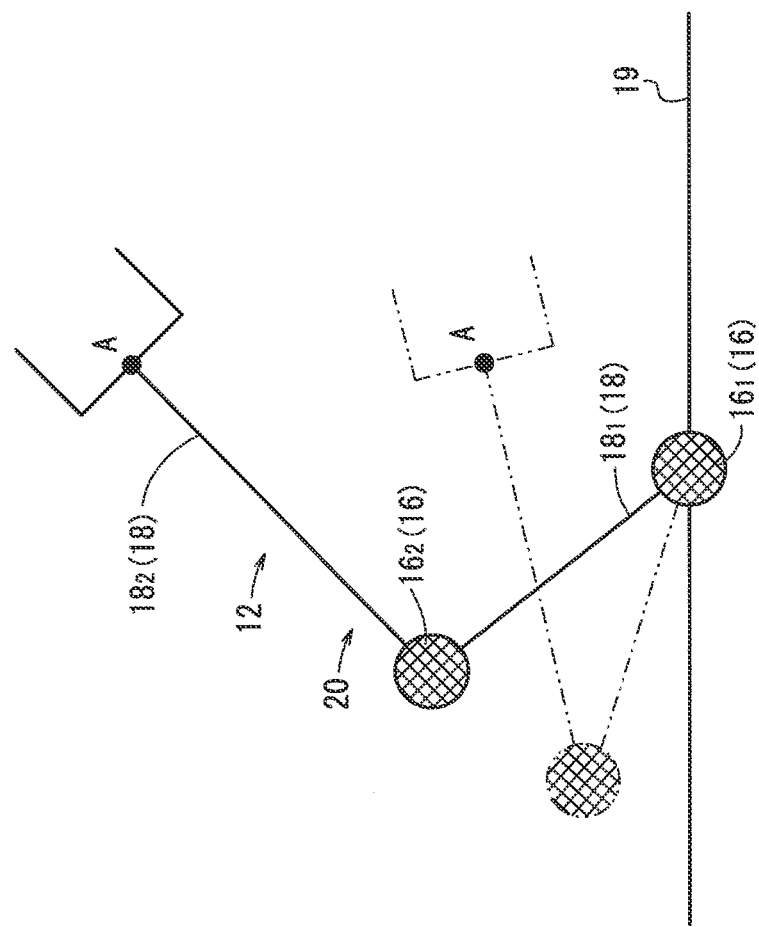
FIG. 4 is a diagram illustrative of a minimum time constant and a maximum time constant.

For example, as shown in FIG. 4, the joint $16_1$ at the foundation of the link 20 as indicated by the solid lines and the joint $16_1$ at the foundation of the link 20 as indicated by the two-dot-and-dash lines have different load states, different torque responses, and different time constants $Tc_i$. Therefore, the time constants $Tc_i$ of the motors 32 of the respective joints $16_i$ are measured, and are set in a range of a minimum time constant $Tc_{i\_min}$ < time constant $Tc_i$ < a maximum time constant $Tc_{i\_max}$.

If the time constant $Tc_i$ is set to the maximum time constant $Tc_{i\_max}$, then the behavior of the joints may be improved excessively. If the time constant $Tc_i$ is set to the minimum time constant $Tc_{i\_min}$, then the behavior of the joints may be stabilized excessively. However, usually, the time constant $Tc_i$ should preferably be set to the minimum time constant $Tc_{i\_min}$.

As described above, the time constants $Tc_i$ of the motors 32 of the respective joints $16_i$ are thus set, and the values of $eff_i$ which represent the diagonal elements of the displaceable member torque response matrix Eff described above are determined based on the set time constants $Tc_i$.

Figure 5:
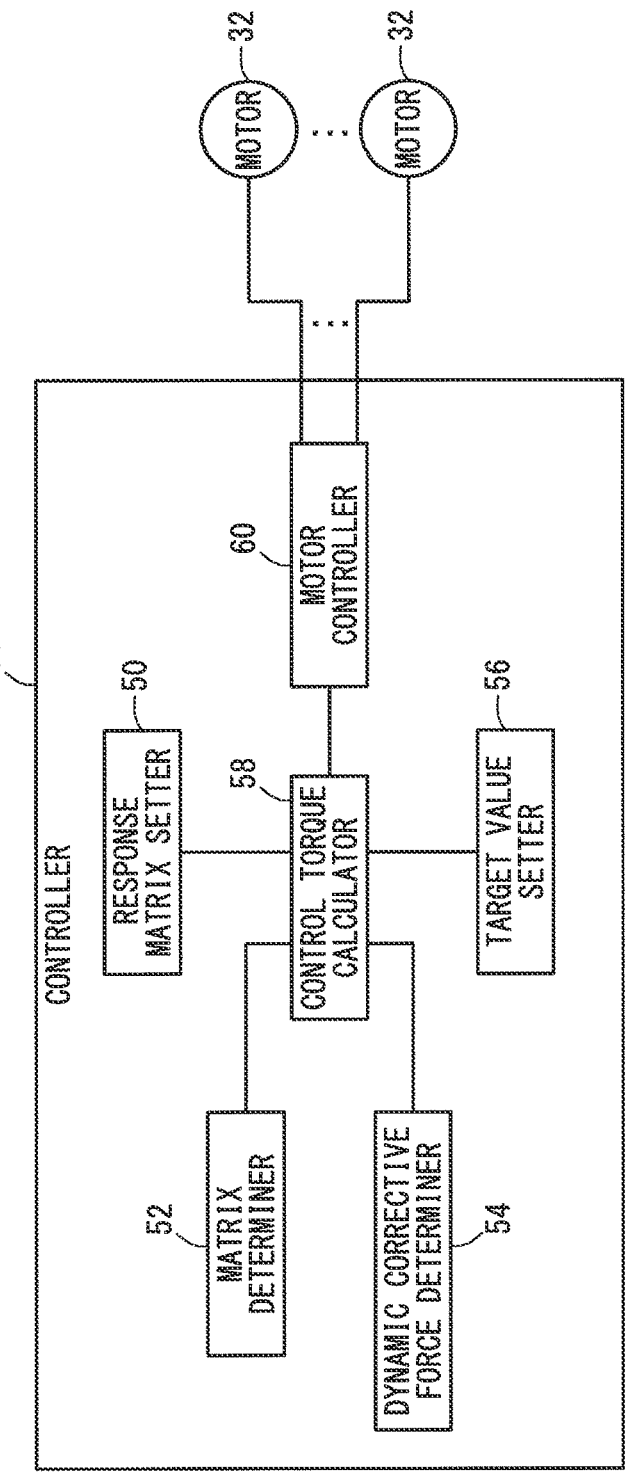
FIG. 5 is a functional block diagram of a controller of the actuating apparatus.

FIG. 5 is a functional block diagram of the controller 14. As shown in FIG. 15, the controller 14 includes a response matrix setter 50, a matrix determiner 52, a dynamic corrective force determiner 54, a target value setter 56, a control torque calculator 58, and a motor controller 60.

The response matrix setter 50 determines time constants $Tc_i$ of the joints $16_i$ based on the minimum time constant $Tc_{i\_min}$ and the time constant $Tc_{i\_max}$ which have been measured for the respective joints $16i$. Then, the response matrix setter 50 sets a displaceable member torque response matrix Eff by determining displaceable member torque response coefficients $eff_i$ of the joints $16_i$ at the determined time constants $Tc_i$, as indicated by the equation (5). According to the present embodiment, the response matrix setter 50 sets the minimum time constant $Tc_{i\_min}$ of the joints $16_i$ as the time constants $Tc_i$ of the respective joints $16_i$. Then, the response matrix setter 50 outputs the set displaceable member torque response matrix Eff to the control torque calculator 58.

The matrix determiner 52 determines an inertial matrix M representing the inertial moment of the actuator 12 based on the actual angles $\theta\_act$ of the plural joints 16. The matrix determiner 52 also determines a Jacobian matrix (coefficient matrix) J depending on the task position A and the actual angles $\theta\_act$ of the plural joints 16. The task position A may be detected by a gyro sensor or the like disposed in the task position A, or may be calculated from the actual angles $\theta_{i\_act}$ of the joints $16_i$. The processes of calculating the inertial matrix M and the Jacobian matrix J are well known in the art and will not be described in detail below. The matrix determiner 52 outputs the determined inertial matrix M and the determined Jacobian matrix J to the control torque calculator 58.

The dynamic corrective force determiner 54 calculates dynamic corrective forces $C_{i\_cmpn}$ which represent force vectors generated by the actual angles $\theta_i$ and the actual angular accelerations $d\theta_i$ of the respective joints $16_i$ under centrifugal forces, Coriolis forces, etc. The dynamic corrective force determiner 54 calculates dynamic corrective forces $C_{i\_cmpn}$ for the respective joints $16_i$ depending on the angles $\theta_i$ of the respective joints $16_i$. The process of calculating dynamic corrective forces $C_{i\_cmpn}$ is well known in the art and will not be described in detail below. The dynamic corrective force determiner 54 outputs the calculated dynamic corrective forces $C_{i\_cmpn}$ to the control torque calculator 58.

The target value setter 56 sets a target angular acceleration dd$\theta$_cntrl for the plural joints 16 or a target acceleration of change ddx_cntrl for the task position A. The target angular acceleration dd$\theta$_cntrl can be determined by a PD control process according to the equation dd$\theta$_cntrl=Kp·($\theta$_des−$\theta$_act)+Kv·(d$\theta$_des−d$\theta$_act). The demand angle $\theta$_des and the demand angular velocity d$\theta$_des or the target acceleration of change ddx_cntrl is determined depending on various factors such as the states of the joints 16 or the task position A. The target value setter 56 outputs the set target angular acceleration dd$\theta$_cntrl for the plural joints 16 or the set target acceleration of change ddx_cntrl to the control torque calculator 58.

The control torque calculator 58 calculates control torques m_$\tau$_cntrl for the plural joints 16 based on the target angular acceleration dd$\theta$_cntrl or the target acceleration of change ddx_cntrl sent from the target value setter 56. Specifically, if the control torque calculator 58 is supplied with the target angular acceleration dd$\theta$_cntrl from the target value setter 56, then the control torque calculator 58 calculates control torques m_$\tau$_cntrl according to the equation (11) from the target angular acceleration dd$\theta$_cntrl, the preceding target angular acceleration dd$\theta$_cntrl_p, the displaceable member torque response matrix Eff, the inertial matrix M, and the dynamic corrective force C_cmpn.

If the control torque calculator 58 is supplied with the target acceleration of change ddx_cntrl from the target value setter 56, then the control torque calculator 58 calculates control torques m_$\tau$_cntrl according to the equation (22) (see the equations (12) through (21) or the equations (11), (23), (24), using the target acceleration of change ddx_cntrl, the preceding target acceleration of change ddx_cntrl_p, the displaceable member torque response matrix Eff, the inertial matrix M, the dynamic corrective force C_cmpn, and the Jacobian matrix J. The control torque calculator 58 outputs the calculated control torques m_$\tau$_cntrl for the plural joints 16 to the motor controller 60.

The motor controller 60 controls the plural motors 32 based on the supplied control torques m_$\tau$_cntrl for the plural joints 16. In this manner, the actuation of the joints $16_i$ or the task position A can be controlled with the improved responsiveness of the joints $16_i$ or the improved responsiveness of the task position A. Consequently, the followability of the actual torque $\tau$_act with respect to the target torque $\tau$_cntrl, i.e., the followability of the actual angular acceleration dd$\theta$_act with respect to the target angular acceleration dd$\theta$_cntrl can be increased.

As described above, the controller 14 calculates control torques m_$\tau$_cntrl for the plural joints 16 so that the actual angular accelerations dd$\theta$_act of the plural joints 16 will reach the present target angular accelerations dd$\theta$_cntrl of the plural joints 16 after the sampling time DT, using the displaceable member torque response matrix Eff representing the torque responses of the plural joints 16, the inertial matrix M of the actuator 12 determined by the angles $\theta$ of the plural motors 32, the present target angular accelerations dd$\theta$_cntrl of the plural joints 16, and the preceding target angular accelerations dd$\theta$_cntrl_p of the plural joints 16. Therefore, the actuation of the plural joints 16 can be controlled with an improved responsiveness, making it possible to enhance followability of the actual angular accelerations ddθ_act of the plural joints 16 with respect to the target angular accelerations ddθ_cntrl of the plural joints 16.

The controller 14 also calculates control torques m_τ_cntrl for the plural joints 16 so that the actual acceleration of change ddx_act at the task position A will reach the target acceleration of change ddx_cntrl at the task position A after the sampling time DT, using the displaceable member torque response matrix Eff representing the torque responsiveness of the plural joints 16, the inertial matrix M and the Jacobian matrix J of the actuator 12 determined by the angles θ of the plural motors 32, the present target acceleration of change ddx_cntrl at the predetermined task position A of the link 20, and the preceding target acceleration of change ddx_cntrl_p at the task position A. Therefore, the actuation of the plural joints 16 can be controlled with an improved responsiveness, making it possible to enhance followability of the actual angular accelerations ddθ_act of the plural joints 16 with respect to the target angular accelerations ddθ_cntrl of the plural joints 16. Consequently, the actuation of the task position A can be controlled with an improved responsiveness, making it possible to enhance followability of the actual acceleration of change ddx_act at the task position A with respect to the target acceleration of change ddx_cntrl at the task position A.

MODIFICATIONS

The above embodiment may be modified as follows:

Modification 1

According to Modification 1, the torque response of an object which is connected to a link and which cannot be actuated by itself is improved.

Figure 6:
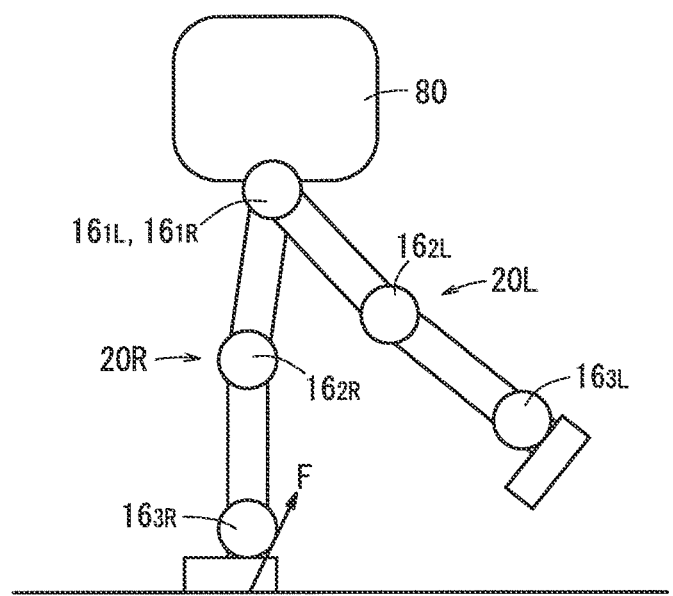
FIG. 6 is a schematic view of an actuator according to Modification 1 of the embodiment.

FIG. 6 shows an actuator 12 according to Modification 1. As shown in FIG. 6, the actuator 12 includes two links 20 for use as legs and a base 80 supported on the links 20. The left link is referred to as a link 20L, and the right link is referred to as a link 20R.

In FIG. 6, the links 20L, 20R have respective sets of three joints, i.e., joints $16_1L$, $16_1R$, joints $16_2L$, $16_2R$, and joints $16_3L$, $16_3R$. The joints $16_1L$, $16_1R$ are connected to the base 80. Alternatively, the links 20L, 20R may have respective sets of two joints $16_i$ or four or more joints $16_i$. According to Modification 1, the actuator includes n joints 16, and the joints 16 of the links 20L, 20R are denoted by $16_i$.

The base 80 is free of joints and motors for actuating such joints, and hence cannot be actuated by itself. However, the base 80 is indirectly actuated freely when the links 20L, 20R are actuated. The structure shown in FIG. 6 is expressed by the following equation of motion.

$$M \cdot \begin{pmatrix} \text{ddbase\_act} \\ \text{dd}\theta\text{\_act} \end{pmatrix} + \begin{pmatrix} \text{C\_cmpn\_base} \\ \text{C\_cmpn} \end{pmatrix} + \begin{pmatrix} Jbase^T \\ J^T \end{pmatrix} \cdot F = \begin{pmatrix} 0 \\ \tau\text{\_act} \end{pmatrix} \quad (25)$$

where $$ddbase = \begin{pmatrix} \text{ddbase}_1\text{\_act} \\ \text{ddbase}_2\text{\_act} \\ \vdots \\ \text{ddbase}_n\text{\_act} \end{pmatrix}, \quad C\_cmpn\_base = \begin{pmatrix} C_1\_\text{cmpn\_base} \\ C_2\_\text{cmpn\_base} \\ \vdots \\ C_n\_\text{cmpn\_base} \end{pmatrix}$$

In the above equation, an actual displacement acceleration ddbase_act is a vector representation of actual displacement accelerations $\text{ddbase}_1\text{\_act}, \text{ddbase}_2\text{\_act}, \ldots, \text{ddbase}_n\text{\_act}$ in respective directions on the base 80. The directions include an x-axis direction, a y-axis direction, a z-axis direction, a rotational direction about an x-axis, a rotational direction about a y-axis, and a rotational direction about a z-axis, etc. The dynamic corrective force C_cmpn_base is a vector representation of dynamic corrective forces $C_1\_\text{cmpn\_base}, C_2\_\text{cmpn\_base}, \ldots, C_n\_\text{cmpn\_base}$ in respective directions on the base 80 under a centrifugal force, a Coriolis force, etc. The dynamic corrective force C_cmpn_base is determined by the dynamic corrective force determiner 54.

Jbase represents a Jacobian matrix (coefficient matrix) representing the relationship between rates of change in respective directions on the base 80 and a rate of change at a foot tip (task position A) as the distal end of the link 20L (20R). J represents a Jacobian matrix representing the relationship between the angular velocities $d\theta_i$ of the motors 32 of the respective joints $16_i$ and a rate of change at a foot tip (task position A) of the link 20L (20R). The Jacobian matrixes Jbase, J are determined by the matrix determiner 52 depending on the position of the base 80, the position of the foot tip, and the actual angles θ_act of the plural joints 16, and the like.

As can be seen from the equation (25), the actual torques τ_act of the motors 32 of the respective joints $16_i$ are determined based on the torques (M·ddθ_act) that are determined based on the actual angular accelerations ddθ_act of the motors 32 of the plural joints 16 and the torques ($J^T \cdot F$) that are applied to the plural joints 16 based on the force F which the task position A receives from the ground. An actual torque to be applied to the base 80 is determined based on the torque (M·ddbase_act) that is determined based on the actual displacement acceleration ddbase_act of the base 80 and the torques ($Jbase^T \cdot F$) that are applied in respective directions to the base 80 based on the force F borne by the task position A. However, since the base 80 has no motor, the actual torque to be applied thereto is nil.

The equation (25) can be modified into the following equation (26).

$$M \cdot \begin{pmatrix} \text{ddbase\_act} \\ \text{dd}\theta\text{\_act} \end{pmatrix} + \begin{pmatrix} \text{C\_cmpn\_base} \\ \text{C\_cmpn} \end{pmatrix} = \quad (26)$$

$$\begin{pmatrix} -Jbase^T \cdot F \\ \tau\text{\_act} - J^T \cdot F \end{pmatrix} = \begin{pmatrix} \tau\_x\_\text{act} \\ \tau\_\theta\_\text{act} \end{pmatrix}$$

The equation (26) can be expressed by the equation (27) below. ddq_act which represents the actual angular accelerations ddθ_act of the plural joints 16 and the actual displacement acceleration ddbase_act of the base 80 is referred to as an actual actuator displacement acceleration, and τ_total_act which represents τ_x_act and τ_θ_act is referred to as a general actual torque.

$$M \cdot \text{ddq\_act} + C'\_\text{cmpn} = \tau\_\text{total\_act} \quad (27)$$

where $$\text{ddq\_act} = \begin{pmatrix} \text{ddbase\_act} \\ \text{dd}\theta\text{\_act} \end{pmatrix}, \quad \tau\_\text{total\_act} = \begin{pmatrix} \tau\_x\_\text{act} \\ \tau\_\theta\_\text{act} \end{pmatrix}$$

The force F that is received by the task position A can be expressed by the equation (28) below as is the case with the equation (6). In the equation (28), F_Eff is a force response matrix representing the response of a force received by the foot tip as the task position A, the force response matrix having diagonal elements represented by force response coefficients $f\_eff_1, f\_eff_2, \ldots, f\_eff_n$. F_cntrl is a target force to be received by the task position A (target force). A force F that is actually received by the task position A with respect to the target force F_cntrl is determined according to the equation (28). By measuring the actual force F with respect to the target force F_cntrl, the response matrix setter 50 sets a desired force response matrix F_Eff.

$$F = (I - F\_Eff) \cdot F\_cntrl + F\_Eff \cdot F\_cntrl\_p \tag{28}$$

where $$F\_Eff = \begin{pmatrix} f\_eff_1 & & 0 \\ & \ddots & \\ 0 & & f\_eff_n \end{pmatrix}$$

The actual torque $\tau\_\theta\_act$ can be expressed by the equation (29) below as is the case with the equation (6). In the equation (29), $\tau\_\theta\_cntrl$ refers to a target torque. The actual torque $\tau\_\theta\_act$ with respect to the target torque $\tau\_\theta\_cntrl$ can be determined according to the equation (29).

$$\tau\_\theta\_act = (I - \text{Eff}) \cdot \tau\_\theta\_cntrl + \text{Eff} \cdot \tau\_\theta\_cntrl\_p \tag{29}$$

The actual torque $\tau\_x\_act$ can be expressed by the equation (30) below as is the case with the equation (6). In the equation (30), $\tau\_x\_cntrl$ refers to a target torque. The actual torque $\tau\_x\_act$ with respect to the target torque $\tau\_x\_cntrl$ can be determined according to the equation (30).

$$\tau\_x\_act = \tag{30}$$
$$(I - Jbase^T \cdot F\_Eff) \cdot \tau\_x\_cntrl + Jbase^T \cdot F\_Eff \cdot \tau\_x\_cntrl\_p =$$
$$(I - xEff) \cdot \tau\_x\_cntrl + xEff \cdot \tau\_x\_cntrl\_p$$

where $$xEff = Jbase^T \cdot F\_Eff$$

By substituting the equations (29), (30) in the actual torque $\tau\_\theta\_act$ and the actual torque $\tau\_x\_act$ in the equation (27), the equation (27) is expressed by the following equation (31).

$$M \cdot ddq\_act + C'\_cmpn = \tag{31}$$
$$\begin{pmatrix} 1 - xEff & 0 \\ 0 & 1 - Eff \end{pmatrix} \cdot \tau\_total\_act + \begin{pmatrix} xEff & 0 \\ 0 & Eff \end{pmatrix} \cdot \tau\_total\_act\_p$$

From general equations of motion, the following equation is derived:

$$M \cdot ddq\_cntrl + C'\_cmpn = \tau\_total\_cntrl \tag{32}$$

where $$ddq\_cntrl = \begin{pmatrix} ddbase\_cntrl \\ dd\theta\_cntrl \end{pmatrix}, \tau\_total\_cntrl = \begin{pmatrix} \tau\_x\_cntrl \\ \tau\_\theta\_cntrl \end{pmatrix}$$

In the above equation, a target displacement acceleration ddbase_cntrl is a vector representation of target displacement accelerations $ddbase_1\_cntrl, ddbase_2\_cntrl, \ldots, ddbase_n\_cntrl$ in respective directions on the base 80. ddq_cntrl which represents the target angular accelerations $dd\theta\_cntrl$ of the plural joints 16 and the target displacement acceleration ddbase_cntrl of the base 80 is referred to as a target actuator displacement acceleration, and $\tau\_total\_cntrl$ which represents $\tau\_x\_cntrl$ and $\tau\_\theta\_cntrl$ is referred to as a general target torque. The target actuator displacement acceleration ddq_cntrl is determined by the target value setter 56 depending on various factors such as the state of the base 80, the plural joints 16, etc.

From the equations (31), (32), the following equation (33) is derived in the same manner as the equation (11) is derived.

$$m\_\tau\_total\_cntrl = \tag{33}$$
$$M \cdot (I - tmEff)^{-1} \cdot (ddq\_cntrl - tmEff \cdot ddq\_cntrl\_p) + C\_cmpn$$

where $$tmEff = M^{-1} \cdot totalEff \cdot M, totalEff = \begin{pmatrix} xEff & 0 \\ 0 & Eff \end{pmatrix}$$

Therefore, the control torque calculator 58 calculates a general control torque m_τ_ddq_cntrl based on the target actuator displacement acceleration ddq_cntrl sent from the target value setter 56, and the motor controller 60 controls the plural motors 32 based on the determined general control torque m_τ_ddq_cntrl.

It is thus possible to determine a general control torque m_τ_ddq_cntrl so that the actual driver displacement acceleration ddq_act will reach the present target actuator displacement acceleration ddq_cntrl after the sampling time DT, based on the present target actuator displacement acceleration ddq_cntrl, the pervious target actuator displacement acceleration ddq_cntrl_p, the inertial matrix M, the force response matrix F_Eff, the displaceable member torque response matrix Eff, etc. When the motors 32 of the joints 16$_i$ are controlled based on the general control torque m_τ_ddq_cntrl, the responsiveness of the actuation of the joints 16$_i$ and the base 80 can be improved.

Modification 2

In the above embodiment and Modification 1, the joints 16 that are rotatable have been described as displaceable members. However, back-and-forth members which are actuatable linearly (actuatable back and forth) may be used as displaceable members.

Figure 7:
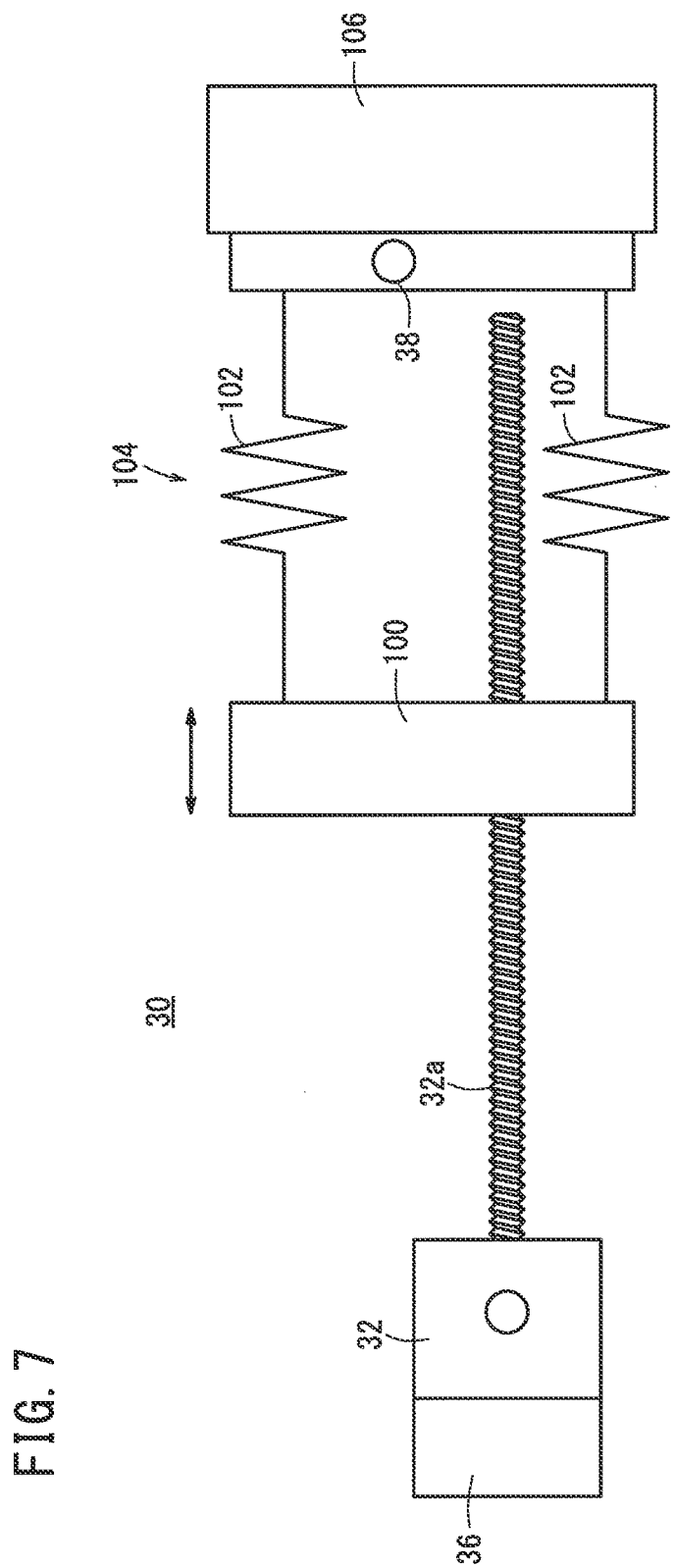
FIG. 7 is a schematic view of the structure of a displaceable member actuating system of an actuator according to Modification 2 of the embodiment.

FIG. 7 schematically shows the structure of a displaceable member actuating system 30 of an actuator 12 according to Modification 2. As shown in FIG. 7, the displaceable member actuating system 30 includes a motor 32, an actuating force converter 100, a power transmission assembly 104 having elastic members 102, and a back-and-forth member 106 connected to the actuating force converter 100 by the elastic members 102. Those parts shown in FIG. 7 which are identical to those shown in FIG. 2 are denoted by identical reference characters.

The actuating force converter 100 is threaded over an externally threaded output shaft 32$a$ of the motor 32. When the output shaft 32$a$ is rotated about its own axis by the motor 32, the actuating force converter 100 is axially moved in one of the directions indicated by the arrow. The actuating force converter 100 and the back-and-forth member 106 are connected to each other by the power transmission assembly 104. Therefore, when the actuating force converter 100 moves on and along the output shaft 32$a$, the back-and-forth member 106 is also moved in one of the directions indicated by the arrow. In FIG. 7, the power transmission assembly 104 is illustrated as having the elastic members 102. However, the power transmission assembly 104 may be devoid of the elastic members 102. The motor 32 is combined with an angle sensor 36 for detecting the angle of the motor 32, and the back-and-forth member 106 is combined with a torque sensor 38 for detecting the torque of the back-and-forth member 106.

Even if each of the joints 16 is replaced with the back-and-forth member 106 which is movable back and forth by the motor 32 shown in FIG. 7, the equations (2) through (33) according to the above embodiment and Modification 1 are also satisfied. Therefore, the responsiveness can be improved for the back-and-forth member 106 replacing each of the joints 16. A speed reducer, not shown, may be connected to the output shaft 32a of the motor 32, and the actuating force converter 100 may be threaded over an externally threaded output shaft of the speed reducer.

Modification 3

In the above embodiment and Modification 1, no elastic members are interposed between the motors 32 and the joints 16. However, elastic members may be interposed between the motors 32 and the joints 16.

Figure 8:
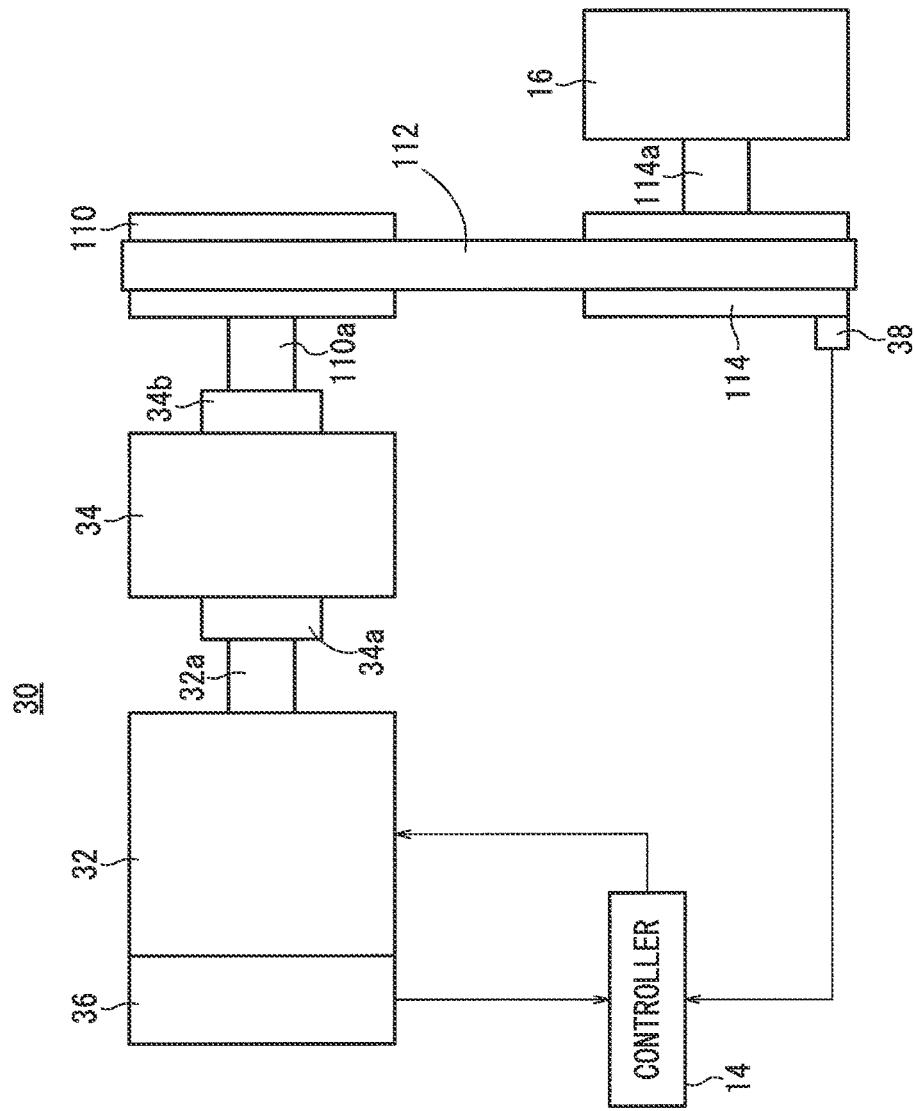
FIG. 8 is a schematic view of the structure of a displaceable member actuating system of an actuator according to Modification 3 of the embodiment.

FIG. 8 schematically shows the structure of a displaceable member actuating system 30 of an actuator 12 according to Modification 3. As shown in FIG. 8, the displaceable member actuating system 30 includes a motor 32, a speed reducer 34, a first pulley 110, a wire 112, a second pulley 114, and a joint 16.

The speed reducer 34 has an input shaft 34a connected to an output shaft 32a of the motor 32, and an output shaft 34b connected to an input shaft 110a of the first pulley 110. The wire 112 comprises an annular elastic member which is trained around the first pulley 110 and the second pulley 114. The wire 112 transmits rotational power from the first pulley 110 to the second pulley 114. The second pulley 114 has an output shaft 114a connected to the joint 16. The motor 32 is combined with an angle sensor 36 for detecting the angle of the motor 32, and the second pulley 114 is combined with a torque sensor 38 for detecting the torque applied to the joint 16.

While the preferred embodiment of the present invention has been described, the technical scope of the present invention is not limited to the disclosure of the embodiment. It is obvious to those skilled in the art that various changes and modifications may be made to the above embodiment. Those change and modifications should be interpreted as being covered by the technical scope of the present invention as defined by the appended claims.

What is claimed is:

1. An actuating apparatus comprising:
   an actuator including a link having a plurality of displaceable members and a plurality of rotary prime movers for actuating the displaceable members; and
   a controller for controlling the actuator;
   wherein the controller includes a control torque calculator for calculating a control torque for the displaceable members so that an actual angular acceleration of the displaceable members will reach a present target angular acceleration of the displaceable members after a sampling time, using a displaceable member torque response matrix representing a torque response of the displaceable members, an inertial matrix of the actuator determined by an angle of the displaceable members, the present target angular acceleration of the displaceable members, and a preceding target angular acceleration of the displaceable members.

2. The actuating apparatus according to claim 1, wherein each of the displaceable members comprises a joint which is rotatable or a back-and-forth member which is actuatable back and forth.

3. The actuating apparatus according to claim 1, wherein the controller calculates the control torque according to the following equation (1):

$$\text{m}\_\tau\_\text{cntrl} = M \cdot (I - mEff)^{-1} \cdot (dd\theta\_\text{cntrl} - mEff \cdot dd\theta\_\text{cntrl}\_p) + C\_\text{cmpn} \quad (1)$$

where $$mEff = M^{-1} \cdot Eff \cdot M$$

$$Eff = \begin{pmatrix} eff_1 & & 0 \\ & \ddots & \\ 0 & & eff_n \end{pmatrix} =$$

$$\begin{pmatrix} \frac{Tc_1}{DT} \cdot \left(1 - \exp\left(-\frac{DT}{Tc_1}\right)\right) & & 0 \\ & \ddots & \\ 0 & & \frac{Tc_n}{DT} \cdot \left(1 - \exp\left(-\frac{DT}{Tc_n}\right)\right) \end{pmatrix}$$

$$\text{m}\_\tau\_\text{cntrl} = \begin{pmatrix} \text{m}\_\tau_1\_\text{cntrl} \\ \text{m}\_\tau_2\_\text{cntrl} \\ \vdots \\ \text{m}\_\tau_n\_\text{cntrl} \end{pmatrix}, \quad dd\theta\_\text{cntrl} = \begin{pmatrix} dd\theta_1\_\text{cntrl} \\ dd\theta_2\_\text{cntrl} \\ \vdots \\ dd\theta_n\_\text{cntrl} \end{pmatrix},$$

$$C\_\text{cmpn} = \begin{pmatrix} C_1\_\text{cmpn} \\ C_2\_\text{cmpn} \\ \vdots \\ C_n\_\text{cmpn} \end{pmatrix}$$

where $\text{m}\_\tau_i\_\text{cntrl}$ represents control torques for i respective displaceable members, M represents an inertial matrix of the actuator, I represents a unit matrix, Eff is a displaceable member torque response matrix, $eff_i$ are displaceable member torque response coefficients, $Tc_i$ are time constants for i respective displaceable members, DT represents a sampling time, $dd\theta_i\_\text{cntrl}$ are target angular accelerations for respective i displaceable members, $dd\theta\_\text{cntrl}\_p$ is a vector representation of preceding target angular accelerations $dd\theta_i\_\text{cntrl}\_p$ for the respective i displaceable members, and $C_i\_\text{cmpn}$ are force vectors generated by motions of displaceable members, wherein i=0, 1, 2, . . . , n.

4. The actuating apparatus according to claim 3, wherein minimum time constants for the displaceable members is measured, and displaceable member torque response coefficients which are diagonal elements of the displaceable member torque response matrix are set using the measured minimum time constants.

5. The actuating apparatus according to claim 1, wherein the control torque calculator calculates the present target angular acceleration of the displaceable members and the preceding target angular acceleration of the displaceable members, using a present target acceleration of change and a preceding target acceleration of change at a predetermined task position on the link and a coefficient matrix representing the relationship between a rate of change at the task position and angular velocities of the displaceable members, for thereby calculating the control torque for the displaceable members so that an actual acceleration of change at the task position will reach the present target acceleration of change after the sampling time.

6. The actuating apparatus according to claim 1, wherein the actuator includes a base supported on the link; and
the control torque calculator calculates the control torque for the displaceable members so that an actual actuator displacement acceleration which includes an actual angular acceleration of the displaceable members and actual displacement accelerations in respective directions of the base will reach a present target actuator displacement acceleration after the sampling time, from the present target actuator displacement acceleration which includes the present target angular acceleration and target displacement accelerations in respective directions for the base, and a preceding target actuator displacement acceleration, using a force response matrix representing the response of a force which a task position on a distal end of the link receives from the ground, a coefficient matrix representing the relationship between rates of change in respective directions of the base and a rate of change at the task position on the link, and a coefficient matrix representing the relationship between the rate of change at the task position and an angular velocity of the displaceable members.

* * * * *